United States Patent
Ma et al.

(10) Patent No.: US 11,394,966 B2
(45) Date of Patent: Jul. 19, 2022

(54) VIDEO ENCODING AND DECODING METHOD AND APPARATUS

(71) Applicant: SZ DJI TECHNOLOGY CO., LTD., Shenzhen (CN)

(72) Inventors: Siwei Ma, Beijing (CN); Xuewei Meng, Beijing (CN); Shanshe Wang, Beijing (CN); Chuanmin Jia, Beijing (CN); Xiaozhen Zheng, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/060,890

(22) Filed: Oct. 1, 2020

(65) Prior Publication Data

US 2021/0021821 A1 Jan. 21, 2021

Related U.S. Application Data

(63) Continuation of application No. PCT/CN2018/081655, filed on Apr. 2, 2018.

(51) Int. Cl.
*H04N 19/117* (2014.01)
*H04N 19/176* (2014.01)
(Continued)

(52) U.S. Cl.
CPC ......... *H04N 19/117* (2014.11); *H04N 19/176* (2014.11); *H04N 19/517* (2014.11); *H04N 19/82* (2014.11)

(58) Field of Classification Search
CPC .... H04N 19/176; H04N 19/117; H04N 19/82; H04N 19/86; H04N 19/80; H04N 19/184; H04N 19/172; H04N 19/61; H04N 19/126

See application file for complete search history.

(56) References Cited

U.S. PATENT DOCUMENTS 6,678,389 B1 * 1/2004 Sun .................... H04N 1/32181
382/100
8,798,184 B2 * 8/2014 Su ........................ H04B 7/0413
375/267

(Continued)

FOREIGN PATENT DOCUMENTS

CN 103442237 A 12/2013
CN 105763881 A 7/2016

(Continued)

OTHER PUBLICATIONS

Q. Guo, C. Zhang, Y. Zhang and H. Liu, "An Efficient SVD-Based Method for Image Denoising," in IEEE Transactions on Circuits and Systems for Video Technology, vol. 26, No. 5, pp. 868-880, May 2016, doi: 10.1109/TCSVT.2015.2416631. (Year: 2016).*

(Continued)

*Primary Examiner* — Daniel Chang
(74) *Attorney, Agent, or Firm* — Anova Law Group, PLLC

(57) ABSTRACT

A video encoding and decoding method includes determining an image block set based on one or more similar image blocks of an image block to be processed, generating an initial structure matrix of the image block set based on a pixel value of each image block in the image block set, and performing a filtering process on the initial structure matrix to obtain a reconstructed structure matrix. The reconstructed structure matrix corresponds to a reconstructed pixel value of the each image block. The filtering process includes one or more point-fixing processes. The method further includes reconstructing the each image block based on the reconstructed pixel value of the each image block.

16 Claims, 4 Drawing Sheets

(51) Int. Cl.
*H04N 19/517* (2014.01)
*H04N 19/82* (2014.01)

(56) References Cited

U.S. PATENT DOCUMENTS

| | | | |
|---|---|---|---|
| 9,883,207 B2* | 1/2018 | Misra | H04N 19/82 |
| 2009/0003134 A1* | 1/2009 | Nuttall | G01S 15/101 |
| | | | 367/87 |
| 2009/0097547 A1* | 4/2009 | Ugur | H04N 19/82 |
| | | | 375/240.02 |
| 2011/0182352 A1* | 7/2011 | Pace | H04N 19/543 |
| | | | 375/240.1 |
| 2011/0268183 A1* | 11/2011 | Sole | H04N 19/46 |
| | | | 375/240.03 |
| 2013/0108236 A1* | 5/2013 | Mestha | G06T 5/001 |
| | | | 386/230 |
| 2013/0128962 A1* | 5/2013 | Rajagopalan | H04N 19/172 |
| | | | 375/240.07 |
| 2013/0128988 A1* | 5/2013 | Rajagopalan | H04N 19/61 |
| | | | 375/E7.126 |
| 2013/0287069 A1* | 10/2013 | Su | H04B 7/0617 |
| | | | 375/219 |
| 2016/0073114 A1* | 3/2016 | Kawamura | H04N 19/107 |
| | | | 375/240.03 |
| 2017/0127089 A1* | 5/2017 | Shi | H04N 19/179 |
| 2017/0351786 A1* | 12/2017 | Quattoni | G06F 40/216 |
| 2019/0045224 A1* | 2/2019 | Huang | H04N 19/147 |
| 2019/0369220 A1* | 12/2019 | Vignon | G01S 15/8977 |

FOREIGN PATENT DOCUMENTS

| | | | |
|---|---|---|---|
| CN | 105791877 A | * | 7/2016 |
| CN | 105791877 A | | 7/2016 |
| CN | 107292851 A | | 10/2017 |

OTHER PUBLICATIONS

The World Intellectual Property Organization (WIPO) International Search Report for PCT/CN2018/081655 dated Jan. 3, 2019 5 Pages (including translation).

* cited by examiner

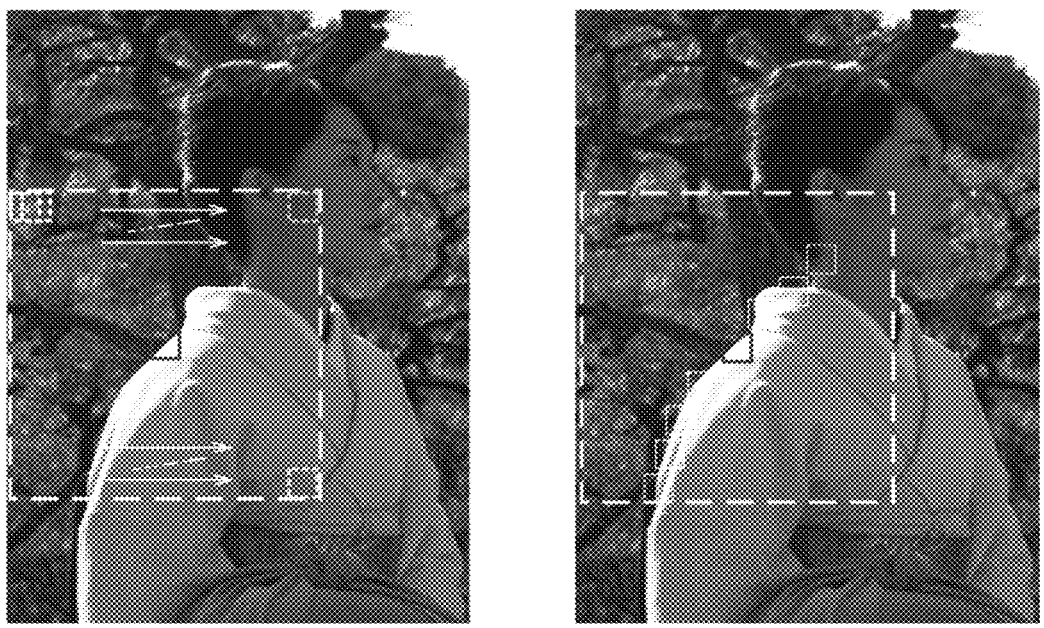
FIG. 5
FIG. 6
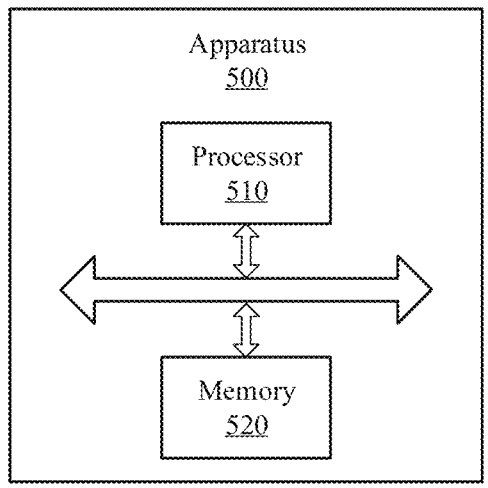
FIG. 7

VIDEO ENCODING AND DECODING METHOD AND APPARATUS

CROSS-REFERENCE TO RELATED APPLICATION

This application is a continuation of International Application No. PCT/CN2018/081655, filed on Apr. 2, 2018, the entire content of which is incorporated herein by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever

TECHNICAL FIELD

The present disclosure relates to the field of imaging processing and, more specifically, to a video encoding and decoding method and apparatus.

BACKGROUND

In-loop filtering is a key part of the video codec framework. In-loop filtering is mainly used to reduce the compression distortion, such as block effect and ring effect generated in the encoding process. In conventional technology, in-loop filtering includes a block-based in-loop filtering technique and a non-local structure-based in-loop filtering technique of images.

The block-based in-loop filtering technique uses the local similarity of the image, but does not fully consider the non-local self-similarity. The non-local structure-based in-loop filtering for video coding (NLSF) of images mainly uses the non-local structure similarity of the image to perform collaborative filtering on the similar structure group obtained by the search.

The conventional techniques are based on floating-point operation, but floating-point operation has a large bit width overhead, which is not ideal for hardware implementation, especially in the design of hardware codecs.

SUMMARY

In accordance with the disclosure, there is provided a video encoding and decoding method including determining an image block set based on one or more similar image blocks of an image block to be processed, generating an initial structure matrix of the image block set based on a pixel value of each image block in the image block set, and performing a filtering process on the initial structure matrix to obtain a reconstructed structure matrix. The reconstructed structure matrix corresponds to a reconstructed pixel value of the each image block. The filtering process includes one or more point-fixing processes. The method further includes reconstructing the each image block based on the reconstructed pixel value of the each image block.

Also in accordance with the disclosure, there is provided a video encoding and decoding apparatus including a memory storing instructions and a processor configured to execute the instructions to determine an image block set based on one or more similar image blocks of an image block to be processed, generate an initial structure matrix of the image block set based on a pixel value of each image block in the image block set, and perform a filtering process on the initial structure matrix to obtain a reconstructed structure matrix. The reconstructed structure matrix corresponds to a reconstructed pixel value of the each image block. The filtering process includes one or more point-fixing processes. The processor is further configured to execute the instructions to reconstruct the each image block based on the reconstructed pixel value of the each image block.

BRIEF DESCRIPTION OF THE DRAWINGS

FIG. 5 is a schematic diagram of an example image to be processed according to an embodiment of the present disclosure.

FIG. 6 is a table of element values in a hard threshold function according to an embodiment of the present disclosure.

FIG. 7 is a schematic block diagram of a video encoding and decoding apparatus according to an embodiment of the present disclosure.

DETAILED DESCRIPTION OF THE EMBODIMENTS

Technical solutions of the present disclosure will be described with reference to the drawings. It will be appreciated that the described embodiments are part rather than all of the embodiments of the present disclosure. Other embodiments conceived by those having ordinary skills in the art on the basis of the described embodiments without inventive efforts should fall within the scope of the present disclosure.

Unless otherwise defined, all the technical and scientific terms used in the present disclosure have the same or similar meanings as generally understood by one of ordinary skill in the art. As described in the present disclosure, the terms used in the specification of the present disclosure are intended to describe example embodiments, instead of limiting the present disclosure.

The formulas in the present disclosure are merely exemplary formulas. Any modification of the formulas should fall within the scope of the present disclosure.

As used herein, the sequence numbers of processes do not represent the execution orders of the processes, which are determined by the function and inherent logic of the processes. The implementation process of the present disclosure is not limited thereto.

It should be understood that the various embodiments described in the present disclosure can be implemented individually or in combination, which is not limited in the embodiments of the present disclosure. Unless otherwise noted as having an obvious conflict, the embodiments or features included in various embodiments may be combined.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure. The term "and/or" used herein includes any suitable combination of one or more related items listed.

Figure 1:
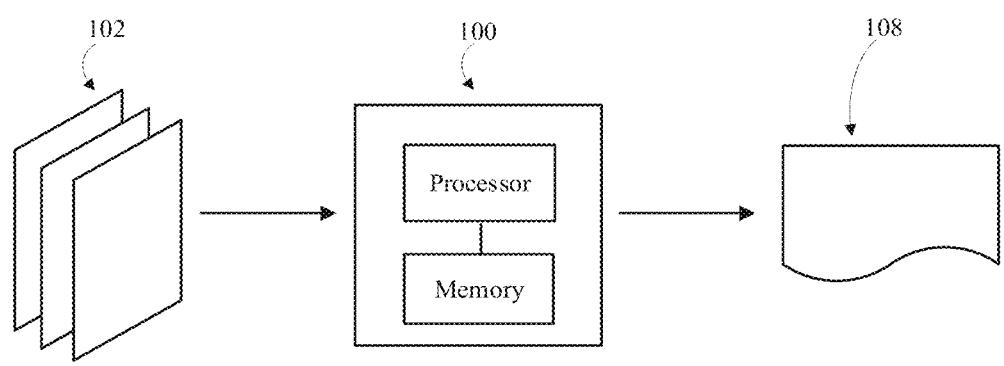
FIG. 1 is an architectural diagram of a technical solution according to an embodiment of the present disclosure.

FIG. 1 is an architectural diagram of a technical solution according to an embodiment of the present disclosure.

As shown in FIG. 1, a system 100 receives to-be-processed data 102 (data to be processed), processes the to-be-processed data 102, and generate processed data 108. For example, the system 100 can receive data to be encoded (to-be-encoded data), and encode the data to be encoded to generate encoded data. Alternatively, the system 100 can receive data to be decoded (to-be-decoded data) and decode the data to generate decoded data. In some embodiments, the components of the system 101 may be implemented by one or more processors. The one or more processors may be in a computing device or a mobile device (e.g., an unmanned aerial vehicle (UAV) or a mobile phone). The one or more processors may be any type of processor, and the present disclosure is not limited thereto. In some designs, the processor may include an encoder, a decoder, or a codec. In some embodiments, the system 101 may also include one or more memories. The one or more memories may be configured to store instructions and data. For example, the one or more memories may be configured to store the to-be-processed data 102, the processed data 108, computer executable instructions for implementing the technical solution consistent with the present disclosure, and the like. The one or more memories may be any type of memory, and the present disclosure is not limited thereto.

The data to be encoded may include text, images, graphic objects, animation sequences, videos, or any other data that needs to be encoded. In some embodiments, the data to be encoded may include sensor data obtained from a sensor. The sensor may be a vision sensor (e.g., a camera, an infrared sensor, or the like), a microphone, a near-field sensor (e.g., an ultrasonic sensor, a radar, or the like), a position sensor, a temperature sensor, a touch sensor, or the like. In some embodiments, the data to be encoded may include user data, such as biological information, which may include facial features, fingerprint scanning information, retinal scanning information, voice recording information, DNA sampling information, or the like.

Figure 2:
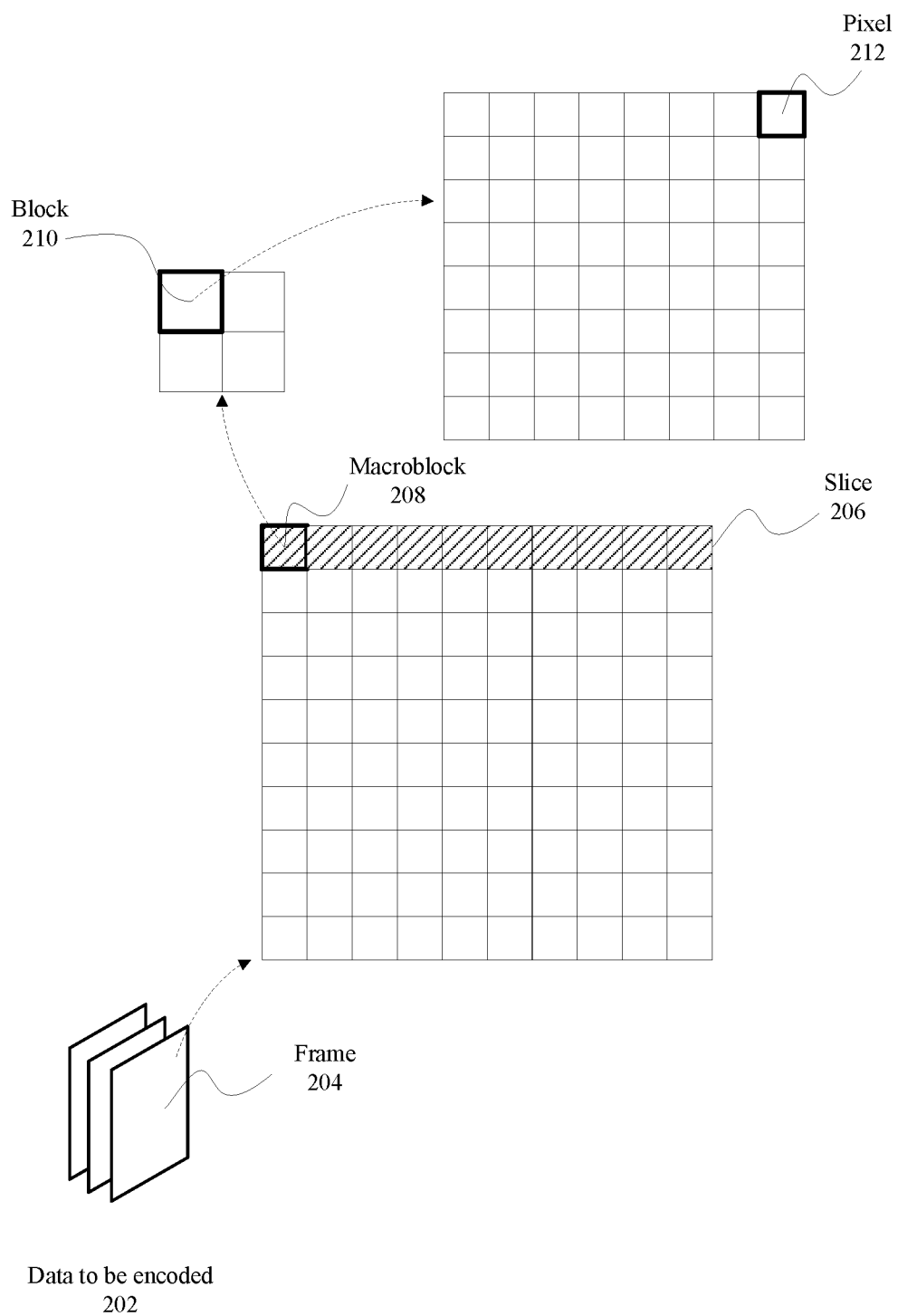
FIG. 2 is a schematic of data to be encoded according to an embodiment of the present disclosure.

FIG. 2 is a schematic diagram showing to-be-encoded data according to an embodiment of the present disclosure.

As shown in FIG. 2, to-be-encoded data 202 includes a plurality of frames 204. For example, the plurality of frames 204 may represent a sequence of continuous image frames in a video stream. Each one of the plurality of frames 204 includes one or more tiles or slices 206. Each one of the one or more tiles or slices 206 includes one or more coding units or macroblocks 208. Each one of the one or more coding units or macroblocks 208 includes one or more blocks 210. Each one of the one or more blocks 210 includes one or more pixels 212. Each one of the one or more pixels 212 may include one or more data sets corresponding to one or more data elements, such as luminance and chrominance data elements. As described above, a data unit of the data to be encoded may include data for one or more pixels, such as data for a frame, a slice, a tile, a coding unit, a macroblock, a block, a pixel, or a combination of any of the above. In some embodiments, the size of the data unit may be unfixed. For example, a frame 204 may include 100 slices 206. One of the 100 slices 206 may include 10 macroblocks. One of the 10 macroblocks may include 4 (e.g., 2×2) blocks 210. One of the 4 blocks 210 may include 64 (e.g., 8×8) pixels 212.

Encoding is commonly used to effectively and/or securely transmitting or storing data. The encoding of the data to be encoded may include data compression, encryption, error-correction encoding, format conversion, and the like. For example, the compression of multimedia data (e.g., videos or audios) can reduce the number of bits transmitted in the network. Sensitive information, such as financial information, personal identification information, or the like, can be encrypted before transmission and storage to protect confidentiality and/or privacy.

Any suitable encoding technique may be used to encode the data to be encoded. The encoding type depends on the data to be encoded and the specific encoding need.

In some embodiments, the encoder can implement one or more different codecs. The codecs may include codes, instructions, or computer programs that implement different encoding algorithms. Based on various factors including the type and/or source of the data to be encoded, receiving entity of the encoded data, available computing resources, network environment, business environment, rules, criteria, and the like, a suitable encoding algorithm can be selected to encode the data to be encoded.

For example, the encoder can be configured to encode a series of video frames. Encoding data of a frame may include a series of processes. In some embodiments, the encoding process may include a prediction process, a transformation process, a quantization process, an entropy encoding process, and/or other processes.

The prediction process may include intra-frame prediction and inter-frame prediction. The purpose of the prediction process is to use the prediction block information to remove the redundant information of the current image block to be encoded. The intra-frame prediction uses the information of the current image frame to obtain prediction block data. The inter-frame prediction uses the information of the reference frame to obtain prediction block data. The process includes dividing the image block to be encoded into several sub-image blocks. Then, for each sub-image block, a reference image is searched for the image block that best matches the current sub-image block as the prediction block. Subsequently, the corresponding pixel values of the sub-image block and the prediction block are subtracted to obtain a residual, and the residuals corresponding to the obtained sub-image blocks are combined to obtain the residual of the image block.

The correlation of the residuals of the image blocks can be removed by using a transformation matrix to transform the residual blocks of the image. That is, redundant information of the image blocks can be removed to improve coding efficiency. The transformation of the data block in the image block usually uses a two-dimensional transformation. That is, at the encoding end, the residual information of the data block can be respectively multiplied by an N×M matrix and its transpose matrix to obtain transform coefficients after the multiplication. The transform coefficients can be quantized to obtain quantized coefficients. Subsequently, the quantized coefficients can be entropy encoded. Finally, the bit stream obtained by entropy encoding and the encoding mode information after encoding are performed, such as the intra-frame prediction mode and the motion vector information, etc., can be stored or send to the decoding end. At the image-decoding end, the entropy-coded bit stream can be obtained first, and then entropy decoding can be performed to obtain the corresponding residuals. The predicted image block corresponding to the decoded motion vector, the intra-frame prediction, and other information image block can be obtained by decoding. The value of each pixel in the current sub-image block can be obtained based on the residual between the predicted image block and the image block.

Figure 3:
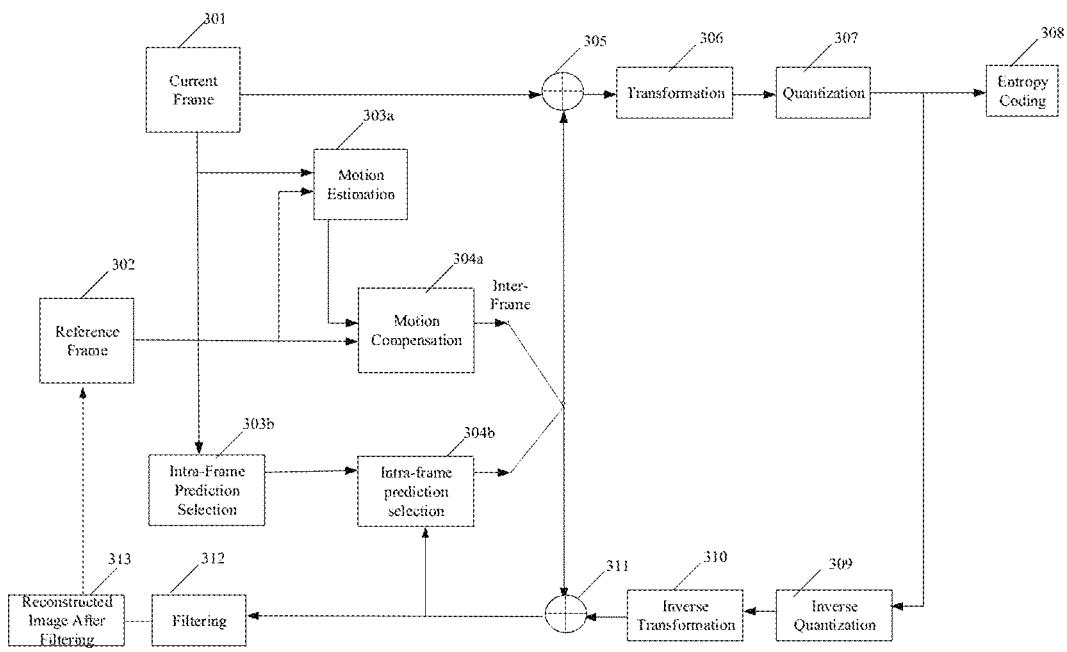
FIG. 3 is a schematic diagram of an encoding framework according to an embodiment of the present disclosure.

FIG. 3 is a schematic diagram of an encoding framework according to an embodiment of the present disclosure.

As shown in FIG. 3, when inter-frame prediction is used, the coding processing can be as follow.

301, acquiring a current image frame.

302, acquiring a reference image frame.

303a, performing a motion estimation using the reference image frame to obtain a motion vector (MV) of each image block of the current image frame.

304a, performing a motion compensation using the motion vector obtained by the motion estimation to obtain an estimated value/predicted value of the current image block.

305, subtracting the estimated/predicted value of the current image block from the current image block to obtain a residual.

306, transforming the residual to obtain a transform coefficient.

307, quantizing the transform coefficient to obtain a quantized coefficient.

308, performing entropy encoding on the quantized coefficient, and storing or sending a bit stream obtained by entropy encoding and the encoding mode information after encoding to a decoding end.

309, performing inverse quantization on the quantized result.

310, performing inverse transform on the inverse quantization result.

311, obtaining a reconstructed pixel using the inverse transform result and the motion compensation result.

312, filtering (in-loop filtering) the reconstructed pixel.

313, outputting the filtered reconstructed pixel. Subsequently, the reconstructed image can be used as a reference image frame in inter-frame prediction for other image frames.

When intra-frame prediction is used, the coding processing can be as follow.

302, acquiring the current image frame.

303b, selecting to perform intra-frame prediction on the current image frame.

304b, performing the intra-frame prediction on a current image block in the current frame.

305, subtracting the estimated value of the current image block from the current image block to obtain a residual.

306, transforming the residual of the image block to obtain a transform coefficient.

307, quantizing the transform coefficient to obtain a quantized coefficient.

308, performing entropy encoding on the quantized coefficient, and storing or sending a bit stream obtained by entropy encoding and the encoding mode information after encoding to a decoding end.

309, performing inverse quantization on the quantized result.

310, performing inverse transform on the inverse quantization result.

311, obtaining the reconstructed pixel by using the inverse transform result and the intra-frame prediction result. The reconstructed image block can be used for intra-frame prediction of the next image block.

Operations corresponding to be encoding end are performed at the decoding end. First, entropy decoding, inverse quantization, and inverse transformation can be used to obtain the residual information, whether the current image block uses the intra-frame prediction or the inter-frame prediction can be determined based on a decoding code stream. In the case of intra-frame prediction, the reconstructed image block in the current frame can be used to construction the prediction information based on the intra-frame method previously described. In the case of inter-frame prediction, the motion information may need to be parsed out, and the parsed motion information can be used to determine the reference block in the reconstructed image to obtain the prediction information. Subsequently, the prediction information and the residual information can be superimposed, and the reconstruction information can be obtained after the filtering operation.

The technical solutions of the embodiments of the present disclosure can be applied to the filtering process of encoding and decoding, for example, it can be applied to NLSF.

Block-based in-loop filtering techniques include bilateral filtering, de-blocking filtering, adaptive sample compensation filtering, and adaptive in-loop filtering. The principle of bilateral filtering is that the current pixel is calculated by the weighted average of the pixel vales of itself and the adjacent four points to achieve edge-preserving de-nosing. De-blocking filtering and adaptive sample compensation filtering follow the method of HEVC. De-blocking filtering is used for predicting the boundary between the prediction unit and the transformation unit, and a low-pass filter obtained by training is used to non-linearly weight the boundary pixels, thereby reducing the blocking effect. The adaptive sample compensation filtering classifies the pixels in the image block, and adds the same compensation value to each type of pixel to make the reconstructed image closer to the original image, thereby suppressing the ringing effect. The adaptive in-loop filtering in a Wiener filter, which is mainly used to minimize the mean square error between the original image and the reconstructed image. The block-based filtering techniques use the local similarity characteristics of the image without fully considering the non-local self-similarity, which greatly limits the performance of the filter. In order to solve this issue, many loop filtering techniques based on non-local similarity characteristics of image are proposed.

In NLSF, the singular value decomposition (SVD) method with relatively high complexity may be used, and the nature of the matrix linear transformation is used to sum and normalize the matrix from rows and columns, respectively. By using an iterative method, the largest singular value of the current matrix modulus and its corresponding left and right singular vectors can be identified, thereby achieving the purpose of quickly calculating the singular value.

The normalization of the rows and columns of the matrix and the calculation of the singular value in the above technique all involve floating-point operation. However, floating-point operation has a large bit width overhead, which is not ideal for hardware implementation, especially in the design of hardware codecs.

The NLSF video coding may mainly use the non-local structure similarity characteristics of images to perform collaborative filtering on similar structure groups obtained by searching.

A specific process of the NLSF is as follow.

First, the entire image frame is read from the buffer after de-blocking filtering, and the image frame is processed in the unit of blocks. The image is divided into K blocks, and these blocks are used as the current block to form a square search window of the size of $W_s*W_s$ for each current block. The image blocks are extracted in a certain order in the search window, e.g., sequentially extracting the image blocks based on a raster scan order, and the similarity between the current and the image block is calculated, e.g., based on the sum of squared differences (SSD) of pixels between the current block and the image block. The extracted image blocks are sorted based on similarity, and c image blocks with the smallest SSD are selected, that is, the c most similar blocks.

Subsequently, the selected c most similar blocks are combined into a set, the pixel values of all blocks in the set are represented by a one-dimensional vector, and the c one-dimensional vectors are formed into a two-dimensional structure array. Further, SVD is performed on the two-dimensional structure array, and hard threshold operation is performed on the singular values to achieve the purpose of filtering. Then the reconstructed structure group is obtained based on the result of SVD, and the image is reconstructed.

In the above NLSF, take the SVD method with relatively high complexity as an example, the normalization of the rows and columns of the matrix and the calculation of the singular value in the above technique all involve floating-point operation. However, floating-point operation has a large bit width overhead, which is not ideal for hardware implementation, especially in the design of hardware codecs.

In the above NLSF, the singular value decomposition (SVD) method with relatively high complexity may generally be used, and the nature of the matrix linear transformation is used to sum and normalize the matrix from rows and columns, respectively. By using an iterative method, the largest singular value of the current matrix modulus and its corresponding left and right singular vectors can be identified, thereby achieving the purpose of quickly calculating the singular value.

Based on this, an embodiment of the present disclosure provides a video encoding and decoding method, which enlarges the floating-point number to an integer for processing by sacrificing certain decimal precision. Strict shift design is used to achieve fixed-point NLSF, while the performance loss is controlled within an acceptable range, thereby improving the performance of in-loop filtering.

The technical solutions of the embodiments of the present disclosure can be applied to both the encoding end and the decoding end. Unless otherwise specified, the described technical solutions of the embodiments of the present disclosure are application to both the encoding end and the decoding end.

Figure 4:
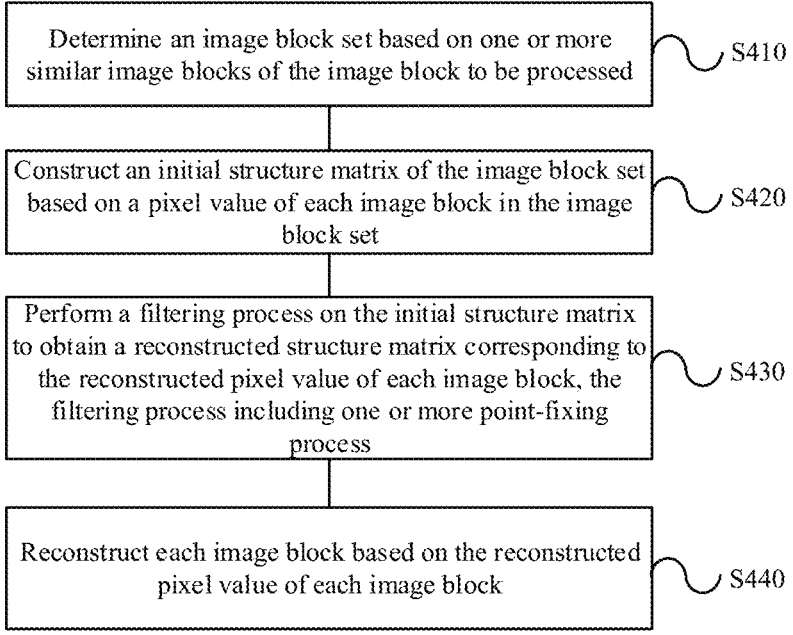
FIG. 4 is a flowchart of a video encoding and decoding method according to an embodiment of the present disclosure.

FIG. 4 is a flowchart of a video encoding and decoding method 400 according to an embodiment of the present disclosure, the method 400 can be performed by an encoder or a decoder. As shown in FIG. 4, the method 400 includes: S410, determining a set of image blocks based on one or more similar image blocks of an image block to be processed (to-be-processed image block); S420, generating an initial structure matrix of the image block set based on a pixel value of each image block in the image block set; S430, performing a filtering process on the initial structure matrix to obtain a reconstructed structure matrix, which corresponds to a reconstructed pixel value of each image block, the filtering process including one or more point-fixing processes; and S440, reconstructing each image block based on the reconstructed pixel value of each image block. The "point-fixing process" refers to a process for making an element, e.g., a number, to be fixed-point, such as converting a floating-point number to a fixed-point number.

In S410, the image block to be processed and one or more similar image blocks of the image block to be processed can be determined, and then a corresponding set of image blocks can be determined, where the image block set may include the image to be processed and one or more similar image blocks. More specifically, in the NLSF technique, for the image block to be processed, the process of determining one or more similar images of the image block to be processed may be referred to as block matching. There are multiple methods of matching the blocks, and the embodiments of the present disclosure are not limited thereto.

In some embodiments, take the image processing shown in FIG. 5 as an example, the entire image frame shown in FIG. 5 may be read from the buffer after de-blocking filtering, and the image frame may be processed in the unit of blocks. The image may be divided into K blocks of the size of $\sqrt{B_s}*\sqrt{B_s}$, and each block may be represented by a vector $x_k$, where ($x_k \in R^{B_s}$, k=1, 2, ..., K). These small blocks may be used as the current block, that is, any small block may be used as the image block to be processed in S410. For example, the solid square in the middle of the left image of FIG. 5 may be any image block to be processed.

A square search window of the size of $W_s*W_s$ can be formed for the current image block to be processed, and the search window can be centered on the current block. For example, the largest dashed square in the middle of the left image of FIG. 5 may be the search window of the image block to be processed represented by the solid square. A plurality of image blocks can be extracted based on a predetermined search order in the search window. For example, based on the raster scanning sequence, starting from the upper left corner of the search window, the image blocks can be extracted from left to right and top to bottom, and ending at the lower right corner of the search window. The similarity between the current image block to be processed and each of the extracted plurality of image blocks may be calculated, the higher the similarity with the current block, the higher the probability of being selected as a similar block. For example, one or more image blocks having the highest similarity to the image block to be processed may be determined as the one or more similar image blocks of the current image block to be processed.

Similarly, when the entire frame of the reconstructed image is acquired for filtering, the pixels in the pixel set may be pixels at any position in the reconstructed image of the current frame, or may be some pixels in the search window. For example, it may be a part of the pixels in a 32×32 pixel set, where the current block may be located in the center of the search window.

In some embodiments, the reconstructed pixels used to obtain the similar block of the current block may include the reconstructed pixel of the coding unit to which the current block belongs, the reconstructed pixel on the upper side of the coding unit, the reconstructed pixel on the left side of the coding unit, the reconstructed pixel on the right side of the coding unit, and the reconstructed pixel on the lower side of the coding unit.

In some embodiments, each block in the coding unit may be filtered after obtaining the reconstructed coding unit (e.g., CTU). For example, the coding unit may be a 128×128 block, and the current block may be a 6×6 block. The coding unit is generally referred to as an image block. When the reconstructed pixels of the current coding unit are acquired, the reconstructed pixels of the coding units on the left and upper sides have been acquired, at the time of coding, the reconstructed pixels used to obtain the similar blocks of the current bock may be the reconstructed pixels on the left and upper sides of the coding to which they belong.

In addition, in an actual video codec system, the reconstructed pixels on the upper side need to be stored in unit of image rows, and the reconstructed pixels on the right side are stored in units of image block heights. For example, for an image with a width of 3840 and an image block height of 128, the reconstructed pixels on the upper side may be stored in units of 3840, and the reconstructed pixels on the right side may be stored in units of 128. The storage cost of the reconstructed pixel on the upper side is generally greater than the storage cost of the reconstructed pixel on the right side. In order to reduce the storage overhead of the video codec system, the number of pixels in the vertical direction of the upper reconstructed pixels (generally, this can be considered as the number of rows of the reconstructed pixels on the upper side) may be less than or equal to the number of pixels in the horizontal direction of the reconstructed pixels on the left side (generally, this can be considered as the number of columns of the reconstructed pixels on the left side).

Of course, the reconstructed pixels used to obtain similar blocks of the current block may also be the reconstructed pixels on the left side, the reconstructed pixels on the upper side, and the reconstructed pixels on the right side of coding unit to which the current block belongs, where the right side of the coding unit needs to be reconstructed.

The embodiments of the present disclosure may also be implemented by different methods. For example, for the currently reconstructed coding unit, for the current block on the upper left side of the coding unit, the reconstructed pixels used to obtain similar blocks may be the reconstructed pixel on the left, upper, lower, and right sides of the current block because the reconstructed pixels on the right and lower sides of the current block still belong to the current coding unit. For the current block on the lower right side of the coding unit, the reconstructed pixels used to obtain similar block may be the reconstructed pixels on the left and upper sides of the current block. This is because the reconstructed pixels on the right and lower sides of the current block belong to the coding units on the right and lower sides, and the coding units on the right and lower sides have not been reconstructed, therefore, these coding units cannot be used to obtain similar blocks of the current block.

It should be understood that the pixel set in the embodiments of the present disclosure may include sparse reconstructed pixels, which means that there may be some pixels in the pixels set, and there may be pixels between (e.g., on the shortest straight line distance between pixels) the pixels that do not belong to the set.

In some embodiments, some pixels in the pixel set may also be aggregated into blocks, and the pixel set may be aggregated into separate blocks (there may be no adjacent pixels between the blocks), where the size of each block may be greater than or equal to the size of the current block.

In some embodiments, the filter may obtain the set of pixels based on a template. More specifically, a template may be preset in the filter, and the template may be used to delineate some reconstructed pixels in the search window. These reconstructed pixels may be understood as the pixel set mentioned in the embodiments of the present disclosure.

In some embodiments, the template may also be understood as a collection of pixels, and the pixels included in the template may be symmetrical with respect to the center of the template. In some embodiments, from the center of the template to the edge of the template, the pixels may be increasingly sparse.

In some embodiments, when using the template to determinate the set of pixels used to obtain similar blocks, the number of pixels in the pixel set may be less than the number of pixels included in the template. This is because when the template is used to delineate some reconstructed pixels in a search range, the edge of the template may exceed the edge of the search range.

In some embodiments, the template may include a plurality of candidate similar blocks for selecting the first similar block, and the size of the candidate similar block may be equal to the size of the current block. The candidate similar block may be that when the similarity with the current block is higher than a certain threshold, the block can be selected as the similar block. In particular, the pixels included in each candidate similar block may not overlap or partially overlap.

In some embodiments, the template may include a plurality of groups of candidate similar blocks from the center to the edge, and each group of candidate similar blocks may form a circle. The circle may be symmetrical with respect to the center of the template, and the candidate similar blocks in the group may be evenly disposed. Of course, the candidate similar blocks included in the template may also be asymmetric.

In some embodiments, the template may include four groups of candidate similar blocks, and the edge pixels of the four groups of candidate similar blocks that are far from the center of the template may be separated by one pixel, two pixels, four pixels, and eight pixels relative to the center of the template.

In some embodiments, the four groups of candidate similar blocks may respectively include four candidate similar blocks, eight candidate similar blocks, eight candidate similar blocks, and eight candidate similar blocks, where the group of candidate similar blocks with four candidate similar blocks may be closest to the center of the template.

In some embodiments, the search window may be searched using different methods. That is, the search may be performed based on other search rules, and a plurality of image blocks obtained by the search may or may not overlap.

In some embodiments, the similarity between the current block and any image block may be determined through a similarity measurement parameter. The similarity measurement parameter may be a parameter used to characterize the similarity. For example, the similarity measurement parameter may be a hash difference, a sum of squared differences (SSD), a sum of absolute differences (SAD), a mean absolute differences (MAD), a mean square differences (MSD), or a structural similarity (SSIM).

It should be understood that in the similarity measurement parameter mentioned above, a large value may indicate a higher similarity, while a smaller value may also indicate a higher similarity.

For example, assume the similarity measurement parameter is the SSD, the formula for calculating the SSD may be as shown in Formula (1).

$$SSD = \sum_{h=0}^{\sqrt{B_s}-1} \sum_{w=0}^{\sqrt{B_s}-1} \left[ f(h, w) - \overset{\$}{f}(h, w) \right]^2 \quad \text{Formula (1)}$$

where f(h,w) denotes the pixel of the current image block to be processed, and $^\$f(h,w)$ denotes the pixel of any extracted image block. For SSD, the smaller the value of SSD, the higher the similarity between two image blocks.

In another example, assume that the similarity measurement parameter is a hash value, the similarity may be determined based on the value of the hash value. The closer the hash values of the two blocks are, the more similar they may be. That is, the smaller the difference between the hash values of the two image blocks, the more similar the two image blocks may be. In some embodiments, the hash value may be expressed by the pixel sum of the image blocks, horizontal gradient, vertical gradient, etc.

Each extracted image block may be sorted based on the similarity to the image block to be processed. One or more blocks that is most similar to the image block to be processed may be selected as the one or more similar image blocks to the image block to be processed. For example, the small dashed square in the right image shown in FIG. 5 may be the similar image block of the image block to be processed represented by the small solid line in the middle.

Subsequently, an image block set of $S_{xk}$ may be formed, and the image block et may include c image blocks, where the c image blocks may include a selected image block to be processed and one or more similar image blocks similar to the image block to be processed.

In S420, an initial structure matrix of the image block set may be generated based on a pixel value of each image block in the image block set. More specifically, take the image block set including c image blocks as an example, the pixel value of each small block in the c image blocks may be represented by a one-dimensional vector as $B_s*1$. For example, take any image block in the set of image blocks as an example, the image block may be divided into $B_s$ pixels, the pixel value of the $B_s$ may be determined, and the one-dimensional vector of $B_s*1$ of the image block may be determined. Subsequently, the c one-dimensional vectors in the image block set may form a two-dimensional structure array of $x_{Gk}$. That is, the initial structure matrix $x_{Gk}$ of the image block set may be expressed as $$x_{G_k} = [x_{G_k \otimes 1}, x_{G_k \otimes 2}, \ldots, x_{G_k \otimes c}] \quad \text{Formula (2)}$$

where the initial structure matrix $x_{Gk}$ may be a matrix of the size of $B_s*c$, and each image block in the image block set may correspond to a column vector.

In S430, a filtering process may be performed on the initial structure matrix to obtain a reconstructed structure matrix, which corresponds to the reconstructed pixel value of each image block, the filtering process including one or more point-fixing processes. In some embodiments, a variety of filtering method may be used to perform the filtering. For example, the SVD filtering method may be used, and filtering methods such as discrete cosine transform (DCT), Hadamard transform, Karhunen-Loeve transform (KLT), signal dependent transform (SDT), wavelet transform, etc., may also be used.

In some embodiments, the filtering method described in the embodiments of the present disclosure may be used in combination with other filtering methods. More specifically, other filtering may be performed after the filtering method described in the embodiments of the present disclosure, or the filtering method described in the embodiments of the present disclosure may be performed after performing other filtering methods.

For the ease of explanation, the following description uses the SVD filtering method an example.

More specifically, the initial structure matrix is subjected to the SVD filtering process, where the SVD filtering process may be divided into two processes, namely a decomposition process and a hard threshold process.

More specifically, the decomposition process may be expressed as:

$$x_{G_k} = U_{G_k} \sum_{G_k} V_{G_k}^T = \sum_{i=1}^{m} \gamma_{G_k \otimes i} \left( u_{G_k \otimes i} v_{G_k \otimes i}^T \right) \quad \text{Formula (3)}$$

where $U_{gk}$ is a left singular matrix composed of left singular vectors of the initial structure matrix $x_{Gk}$, $\Sigma_{gk}$ denotes a maximum singular value matrix composed of a plurality of maximum singular values of the initial structure matrix $x_{Gk}$, and $V_{gk}$ is a right singular matrix composed of right vectors of the initial structure matrix $x_{Gk}$. In particular, each maximum singular value may correspond to a left singular vector and a right singular vector.

The hard threshold process may expressed as:

$$\alpha_{G_k} = \text{hard}(\gamma_{G_k}, \tau) = \gamma_{G_x} e1(\text{abs}(\gamma_{G_k}) - \tau) \quad \text{Formula (4)}$$

where hard (x,a) denotes the hard threshold function in the hard threshold process, and e in the function is the dot product of the two vectors; and τ denotes the threshold, which can be obtained through offline training. By performing the hard threshold process on the maximum singular value matrix of the initial structure matrix $x_{Gk}$, the purpose of filtering may be achieved.

It should be understood that since both the decomposition process and the hard threshold process of the SVD involve floating-point operation, and floating-point operation have a large bit width overhead, which is not ideal for hardware implementation, especially in the design of hardware codecs, therefore, in the embodiments of the present disclosure, an appropriate loss of decimal precision is adopted to enlarge the floating-point numbers. Further, a strict shift design may be used to achieve fixed-point NLSF, thereby controlling the performance loss within an acceptable range.

In the embodiments of the present disclosure, for the decomposition process in the SVD filtering process, the initial structure matrix $x_{Gk}$ may be decomposed, and the decomposition process can be divided into an outer loop part and an inner loop part. The outer loop part is to perform a first SVD process a plurality of times to obtain a plurality of maximum singular values, a plurality of left singular vectors, and a plurality of right singular vectors of the initial structure matrix. In the plurality of first SVD processes, a first SVD process may be used to determine a maximum singular value of the initial structure matrix, and a left singular vector and a right singular vector corresponding to the maximum singular value. The outer loop part may further include constructing a maximum singular value matrix based on the plurality of maximum singular values; constructing the a left singular matrix based on the maximum singular value matrix and the plurality of left singular vectors; constructing the a right singular matrix based on the maximum singular value matrix and the plurality of right singular vectors; and determining a reconstructed structure matrix based on the maximum singular value matrix, the left singular matrix, and the right singular matrix.

The inner loop part is to perform a second SVD process a plurality of times on an input matrix for any first SVD process among the plurality of first SVD processes on the initial structure matrix to obtain a plurality of singular values and the left and right singular vectors corresponding to each singular value in the plurality of singular values. Each second SVD process in the plurality of second SVD processes may be used to determine a singular value of the input matrix, and the corresponding left singular vector and right singular vector. When the current first SVD process is the first first SVD process in the plurality of first SVD processes (i.e., the first one of the plurality of first SVD processes, the earliest one of the plurality of first SVD processes, or the first process that is performed for the first time), the input matrix may be is the initial structure matrix. The inner loop part may further include outputting the maximum value in the plurality of singular values as the first maximum singular value obtained by the current first SVD process; and outputting the first left singular vector and the first right singular vector corresponding to the first maximum singular value.

Take the current SVD process as an example, for the outer loop part, the current first SVD process may be any one of the plurality of first SVD processes. The current first SVD process may include performing a plurality of second SVD processes on the input matrix based on a normalization algorithm to obtain a plurality of singular values, and the left and right singular vectors corresponding to each of the plurality of singular values. Each second SVD process in the plurality of second SVD processes may be used to determine a singular value of the input matrix, and the corresponding left singular vector and right singular vector. When the current first SVD process is the first first SVD process in the plurality of first SVD processes, the input matrix may be is the initial structure matrix. The outer loop part may further include outputting the maximum value in the plurality of singular values as the first maximum singular value obtained by the current first SVD process; outputting the first left singular vector and the first right singular vector corresponding to the first maximum singular value; and determining an output matrix based on the first left singular vector and the first right singular vector. In addition, the input matrix of the next first SVD process of the current first SVD process may also be determined based on the difference between the output matrix and the input matrix.

It should be understood that the number of times of the outer loop may be determined based on a first predetermined condition, that is, the number of times of performing the first SVD process can be determined. For example, when performing the current first SVD process on the initial structure matrix, if the current first SVD process satisfies the first predetermined condition, the next first SVD process on the initial structure matrix may be stopped. That is, the current first SVD process may be the last first SVD process in the plurality of first SVD processes. In another example, the first SVD process may be performed on the initial structure matrix a plurality of times. In the plurality of first SVD processes, a plurality of first SVD processes satisfying the first predetermined condition may be determined.

In some embodiments, the first predetermined condition may include the number of times of the first SVD processes being performed is less than or equal to a first predetermined number of times. For example, when performing the current first SVD process on the initial structure matrix, if the total number of times of the first SVD process including the current first SVD process is less than or equal to the first predetermined number, the next first SVD process on the initial structure matrix may be stopped. That is, the current first SVD process may be the last first SVD process in the plurality of first SVD processes. In another example, the first SVD process may be performed on the initial structure matrix a plurality of times. In the plurality of first SVD processes, a plurality of first SVD processes may be determined based on the first predetermined number of times. For example, the plurality of first SVD processes that are executed first may be determined based on the order of execution.

In some embodiments, the first predetermined condition may include the difference between the two largest singular values obtained in the last two of the plurality of first SVD processes being less than a first predetermined value. For example, when performing the current first SVD process on the initial structure matrix, if the difference between the maximum singular value obtained in the current first SVD process and the maximum singular value obtained in the previous process is less than the first predetermined value, the next first SVD process on the initial structure matrix may be stopped. That is, the current first SVD process may be the last first SVD process in the plurality of first SVD processes. In another example, the first SVD process may be performed on the initial structure matrix a plurality of times. The first few first SVD processes may be determined in the plurality of first SVD processes such that the difference between the two largest singular values obtained in the last two processes of the plurality of first SVD processes may be less than the first predetermined value.

In some embodiments, the first predetermined condition may include the maximum singular value obtained by the last first SVD process being less than the hard threshold. For example, when performing the current first SVD process on the initial structure matrix, if the maximum singular value obtained by the current first SVD process is less than the hard threshold, the next first SVD process on the initial structure matrix may be stopped. That is, the current first SVD process may be the last first SVD process in the plurality of first SVD processes. In another example, the first SVD process may be performed on the initial structure matrix a plurality of times. The first few first SVD processes may be determined in the plurality of first SVD processes such that the maximum singular value obtained in the last process of the plurality of first SVD processes may be less than the hard threshold.

It should be understood that for the maximum singular values constructing the maximum singular value matrix may include deleting the maximum singular value less than or equal to the hard threshold in the plurality of maximum singular values to obtain the remaining maximum singular values; and constructing the maximum singular value matrix based on the remaining maximum singular values.

For the inner loop part, performing a plurality of second SVD processes on the input matrix of any first SVD process may include summing the input matrix by row or column to obtain a one-dimensional first vector based on the normalization algorithm, the number of elements in the first vector may be equal to the number of image blocks in the image block set; determining a first normalization factor based on the first vector; determining a second vector based on the first vector and the first normalization factor; and performing the current second SVD process on the second vector to obtain a second singular value, a second left singular vector, and a second right singular vector of the input matrix, the current second SVD process may be any one of the plurality of second SVD processes. In addition, the current second SVD process may include determining a third vector based on an inner product of an input vector and the input matrix; determining a second normalization factor based on the third vector; determining the second left singular vector based on the third vector and the second normalization factor; determining a fourth vector based on the inner product of the second left singular vector; determining a third normalization factor based on the fourth vector; determining the second right singular vector based on the fourth vector and the third normalization factor; determining the modulus of the fourth vector as the second singular value; and determining the second right singular vector as the input vector of the next second SVD process of the current second SVD process. In some embodiments, when the current second SVD process is the first second SVD process in the plurality of second SVD processes, the input vector may be the second vector.

It should be understood that the number of times of the inner loop may be determined based on a second predetermined condition, that is, the number of times of performing the second SVD process can be determined. For example, when performing the current second SVD process on the input matrix, if the current second SVD process satisfies the second predetermined condition, the next second SVD process on the input matrix may be stopped. That is, the current second SVD process may be the last second SVD process in the plurality of second SVD processes. In another example, the second SVD process may be performed on the input matrix a plurality of times. In the plurality of second SVD processes, a plurality of second SVD processes satisfying the second predetermined condition may be determined.

In some embodiments, the second predetermined condition may include the number of times of the second SVD processes being performed is less than or equal to a second predetermined number of times. For example, when performing the current second SVD process on the input matrix, if the total number of times of the second SVD process including the current second SVD process is less than or equal to the second predetermined number, the next second SVD process on the input matrix may be stopped. That is, the current second SVD process may be the last second SVD process in the plurality of second SVD processes. In another example, the second SVD process may be performed on the input matrix a plurality of times. In the plurality of second SVD processes, a plurality of second SVD processes may be determined based on the second predetermined number of times. For example, the plurality of second SVD processes that are executed first may be determined based on the order of execution.

In some embodiments, the second predetermined condition may include the difference between the two singular values obtained in the last two of the plurality of second SVD processes being less than a second predetermined value. For example, when performing the current second SVD process on the input matrix, if the difference between the singular value obtained in the current second SVD process and the singular value obtained in the previous process is less than the second predetermined value, the next second SVD process on the input matrix may be stopped. That is, the current second SVD process may be the last second SVD process in the plurality of second SVD processes. In another example, the second SVD process may be performed on the input matrix a plurality of times. The first few second SVD processes may be determined in the plurality of second SVD processes based on the execution order, such that the difference between the two singular values obtained in the last two processes of the plurality of second SVD processes may be less than the second predetermined value.

In some embodiments, the first predetermined condition may include the singular value obtained by the last second SVD process being less than a third predetermined value. For example, when performing the current second SVD process on the input matrix, if the singular value obtained by the current second SVD process is less than the hard threshold, the next second SVD process on the input matrix may be stopped. That is, the current second SVD process may be the last second SVD process in the plurality of first SVD processes. In another example, the second SVD process may be performed on the input matrix a plurality of times. The first few second SVD processes may be determined in the plurality of second SVD processes based on the execution order, such that the singular value obtained in the last process of the plurality of second SVD processes may be less than the hard threshold.

It should be understood that any one of the plurality of first SVD processes may further include a first point-fixing process, and the any one of the first SVD processes may be used to determine the first maximum singular value of the initial structure matrix, and the first left singular vector and the first right singular vector corresponding to the first maximum singular value, such that at least one of the following elements may be a fixed-point number: an element in the initial structure matrix, the first maximum singular value, an element in the first left singular vector, and an element in the first right singular vector. The first point-fixing process may include enlarging the initial structure matrix, the elements in the initial structure matrix after enlargement being fixed-point numbers. In some embodiments, the first point-fixing process may further include adjusting the enlargement of the input matrix in the current first SVD process based on the decimal places of the elements in the initial structure matrix, such that the input matrix may have the same enlargement as the initial structure matrix after enlargement. In some embodiments, when the current first SVD process is the first SVD process in the plurality of first SVD processes, the input matrix may be the initial structure matrix.

For example, each element in the initial structure matrix $x_{Gk}$ is generally a number taking up 1-10 bits with a value range of (−1023, 1023), and, corresponding to the decimal representation, each element is generally accurate to 4-5 decimal places. Therefore, in order to make each element in the initial structure matrix $x_{Gk}$ to be fixed-point (e.g., making each element an integer), the initial structure matrix $x_{Gk}$ may be enlarged, such that each element in the initial structure matrix $x_{Gk}$ may become an integer.

Similarly, the current second SVD process may also include a second point-fixing process, such that one or more of the second singular value, an element in the second left singular vector, or an element in the second right singular vector may originally be a fixed-point number. The second point-fixing process may include reducing the first normalization factor, such that the elements in the second vector determined based on the reduced first normalization factor may be fixed-point numbers; and/or, reducing the second normalization factor, such that the elements in the left singular vector determined based on the reduced second normalization factor may be fixed-point numbers; and/or; reducing the third normalization factor, such that the elements in the right singular vector determined based on the reduced third normalization factor may be fixed-point numbers.

The inner loop part and the outer loop part will be described in detail in conjunction with specific embodiments.

Starting with the first second SVD process in the first first SVD process for the initial structure matrix $x_{Gk}$. For the current second SVD process, corresponding to the inner loop part, at first, the initial structure matrix $x_{Gk}$ corresponding to the image block set may be determined based on the image content in the video coding filter. The initial structure matrix $x_{Gk}$ may be transposed to obtain a structure similar group matrix X, and the structure similar group matrix X may be summed row by row to obtain a vector V0, that is, initial structure matrix $x_{Gk}$ may be summed by columns to obtain the vector V0, and the V0 may be a first vector V0. The first normalization vector may be determined based on the first vector V0, and the first normalization factor may be reduced. The first vector V0 may be normalized based on the first normalization factor after the reduction process to obtain the normalized vector V0, which may be a second vector V0'.

It should be understood that since the size of the initial structure matrix $x_{Gk}$ may be $B_s*c$, the size of the corresponding structure similar group matrix X may be $c*B_s$. The first vector V0 obtained after the row-wise summation may be an array of length c, and the first vector V0 may be expressed as V0=[$v1_1$, $v1_2$, ... $v1_c$]. The first vector V0 may be normalized, that is, each element in the first vector V0 may be divided by the corresponding normalization factor to obtain the second vector V0', which can be expressed as V0'=[$v1'_1$, $v1'_2$, ... $v1'_c$].

It should be understood that each element in the initial structure matrix $x_{Gk}$ is generally a number taking up 1-10 bits with a value range of (−1023, 1023) and, corresponding to the decimal representation, each element is generally accurate to 4-5 decimal places. The range of each element in the first vector V0 may be 0~$B_s*(1<<10)$, where $B_s$ may be set as 36 in the program, then $B_s*(1<<10)$ may be shifting the binary $B_s$ to the left by 10 bits, and the range of each element in the first vector V0 may be (0, 36864).

In order to make each element in the structure similar group matrix X be an integer, the matrix obtained after transposing the initial structure matrix $x_{Gk}$ may be enlarged. That is, the transposed matrix may be shifted to the left to obtain a structure similar group matrix X of a similar structure. For example, the transposed matrix may be shifted by 4 bits to obtain the structure similar group matrix X, which is numerically expanded by $2^4$, such that each element in the structure similar group matrix X may be a fixed-point number. For example, each element in the structure similar group matrix X may be an integer taking up at most 32 bits. Correspondingly, the first vector V0 may also be a fixed-point number, which can be expressed by a 64-bit integer.

It should be understood that in the embodiments of the present disclosure, the first vector V0 may be normalized, that is, the second vector V0' may be determined based on each element in the first vector V0 and the first normalization factor, where the first normalization factor may be obtained by determining the modulus of the first vector V0. More specifically, the following formula may be used to determine the modulus abs(V0) of the matrix V0.

$$\text{abs}(V0) = \sqrt{\sum_{j=1}^{c} v0_j^2} \quad \text{Formula (5)}$$

The modulus of the first vector V0 may be a value of the size of 0~$c*(1<<(20*B_s*B_s))$, and c may be a number around 20 in the program. $B_s$ may be set as 36 in the program, that is, $c*(1<<(20*B_s*B_s))$ may be to shift the binary representation of c to the left by $20*B_s*B_s$. The integer part of the modulus of the first vector V0 may include 11 digits, and can be accurate to 3-4 digits after the decimal point.

If the modulus of the first vector V0 is directly used as the first normalization factor, correspondingly, the second vector V0' obtained after normalizing the first vector V0 may be a decimal between −1 and 0 with 6-7 digits after the decimal point. In order to make the elements in the second vector V0' as fixed-point numbers, in the calculation of the normalization factor, the first normalization factor determined based on the modulus of the first vector V0 may be shifted to the right by a certain number of digits, such as shifting the first normalization factor by 13 digits. The first normalization factor obtained after the reduction process may be used as the dividend, which is equivalent to shifting the value of the original second vector V0' to the left by 13 digits, and the second vector V0 may become a fixed-point number taking up at most 64 bits.

A third vector U1 may be obtained by performing a dot product operation on the second vector V0' obtained by the normalization process based on the first reduced normalization factor and the structure similar group matrix X. The third vector U1 may be normalized to obtain a normalized vector U1' based on the second normalization factor, which may be the left singular vector calculated for the partial iteration of the inner loop part of the current round.

Since the second vector V0 is an array of length c, the size of the structure similar group matrix X is $c*B_s$, the third vector U1 obtained after the dot product operation may be an array of the length of $B_s$. The third vector U1 may be normalized, that is, the left singular vector U1' may be obtained based on each element in the third vector U1 and the second normalization factor, and the left singular vector U1' may be a vector of the length of $B_s$.

It should be understood that the third vector U1 may be normalized in the embodiments of the present disclosure. That is, the left singular vector U1' may be determined based on each element in the third vector U1 and the second normalization factor, where the second normalization factor may be the modulus of the third vector U1, and the second normalization factor may be reduced. More specifically, The modulus abs(U1) of the third vector U1 may be determined by using the following formula.

$$\text{abs}(U1) = \sqrt{\sum_{j=1}^{Bs} U1_j^2} \quad \text{Formula (6)}$$

It should be understood that the structure similar group matrix X may be a fixed-point number after being enlarged, the second vector V0' obtained based on the reduced normalization factor may be a fixed-point number, and the third vector U1 obtained after the dot product operation may also be a fixed-point number. In order to make the left singular vector U1' also a fixed-point number, similar to the second vector V0 obtained by normalizing the first vector V0 above, the second normalization factor may be shifted to the right by a certain number of digits, such as shifting the second normalization factor by 13 digits. That is, the modulus of the third vector U1 may be reduced. Using the reduced second normalization factor as the dividend, which is equivalent to shifting the value of the original left singular vector U1' to the left by 13 digits, the left singular vector U1' may also be a fixed-point number.

A fourth vector V1 may be obtained by performing a dot product operation on the left singular vector U1' and the structure similar group matrix X, such that the modulus of the fourth vector V1 may be the singular value S1 calculated iteratively for the inner loop part of the current round. The fourth vector V1 may be normalized based on the third normalization factor after the reduction process to obtain the normalized vector V1', which may be the right singular vector calculated for the partial iteration of the inner loop part of the current round.

The left singular vector U1' may be a vector of a length of $B_s$, the size of the structure similar group matrix X may be $c*B_s$, the fourth vector V1 obtained after the dot product operation may be an array of the length of c. The fourth vector V1 may be normalized, that is, each element in the matric V1 may be divided by the corresponding normalization factor to obtain the right singular vector V1', and the right singular vector V1' may be a vector of the length of c.

It should be understood that the fourth vector V1 may be normalized in the embodiments of the present disclosure. That is, the right singular vector V1' may be determined based on each element in the fourth vector V1 and the third normalization factor, where the third normalization factor may be determined based on the modulus of the fourth vector V1, and the third normalization factor may be reduced. More specifically, The modulus abs(V1) of the fourth vector V1 may be determined by using the following formula.

$$\text{abs}(V1) = \sqrt{\sum_{j=1}^{c} v1_j^2} \qquad \text{Formula (7)}$$

It should be understood that the structure similar group matrix X may be a fixed-point number after being enlarged, the left singular vector U1' also obtained based on the reduced second normalization factor may be a fixed-point number, and the fourth vector V1 obtained after the dot product operation may also be a fixed-point number, that is, the singular value S1 may be a fixed-point number. In order to make the right singular vector V1' also a fixed-point number, similar to the second vector V0 or the left singular vector U1' obtained by normalizing the first vector V0 or the third vector U1 above, the fourth vector V1 may be determined to be the third normalization vector, and the third normalization vector may be shifted to the right by a certain number of digits, such as shifting the third normalization factor by 13 digits. Take reduced third normalization factor as the dividend, which is equivalent to shifting the value of the original right singular vector V1' to the left by 13 digits, the right singular vector V1' may also be a fixed-point number.

It should be understood that through the above process, the singular value S1 of the initial structure matrix $x_{Gk}$ and the corresponding left singular vector U1' and right singular vector V1' may be obtained, which may be the current second SVD process output singular value S1 and the corresponding left singular vector U1' and right singular vector V1'. The calculated fourth vector V1 may be replaced with the second vector in the above process and brought into the above process for the next second SVD process, such that another set of singular values S2 and the corresponding left singular vector U1' and right singular vector V1' may be calculated. By analogy, a plurality of second SVD processes may be performed to output a plurality of singular values and the left and right singular vectors corresponding to each of the plurality of singular values.

It should be understood that the number of times the plurality of second SVD processes are performed may be determined based on a second predetermined condition, and the second predetermined condition may be the second predetermined condition described above, which will not be described herein again.

It should be understood that after the plurality of second SVD processes is performed and the plurality of singular values and the left and right singular vectors corresponding to each singular value in the plurality of singular values are output, the inner loop part of the current round corresponding to the first SVD process may be completed. Subsequently, the maximum value in the plurality of singular values may be determined as the first maximum singular value of the initial structure matrix output by the inner loop, that is the first maximum singular value output by the first first SVD process. Corresponding to the first maximum singular value, the first left singular vector and the first right singular vector may also be output.

In the embodiments of the present disclosure, the currently output first left singular vector may be multiplied by the first right singular vector to obtain the output matrix, and the input matrix of the next first SVD process may be based on the difference between the output matrix and the initial structure matrix. More specifically, the first left singular vector may be multiplied by the first right singular vector to obtain a matrix whose output matrix may be $B_s*c$. Since the size of the initial structure matrix $x_{Gk}$ is also $B_s*c$, the difference matrix of the two may be used as the input matrix for the next first SVD process. That is, the input matrix may be used as an input to replace the structure matrix $x_{Gk}$ during the first first SVD process, and the next set of maximum singular values and the corresponding left and right singular vector may be output.

It should be understood that due to the process of determining the first maximum singular value, the initial structure matrix $x_{Gk}$ may be enlarged, such as shifting 4 digits to the left; and the first normalization factor, the second normalization factor, and the third normalization factor may be reduced, such as shifting 13 digits to the right, the first left singular vector and the first right singular vector may be relatively enlarged by 13 digits. As such, by multiplying the first left singular vector by the first right singular vector, the obtained the output matrix may be enlarged by 17+13+13=43 digits. Therefore, when determining the input matrix for the next first SVD process based on the difference between the output matrix and the current input matrix (e.g., the input matrix may be the initial structure matrix during the first first SVD process), considering that the input matrix may be enlarged by 4 digits and the output matrix may be enlarged by 43 digits, the output matrix may be reduced by 17+13+13−4=39 digits first to maintain the same enlargement as the input matrix. Subsequently, the difference between the reduced output matrix and the input matrix may be determined as the input matrix of the next first SVD process.

In the embodiments of the present disclosure, based on the above process, the first SVD process may be performed a plurality of times to determine the plurality of maximum singular values and the corresponding plurality of left singular vectors and right singular vectors. The number of times that the plurality of first SVD processes are performed may be determined based on a first predetermined condition, and the first predetermined condition may be the first predetermined condition described above, which will not be repeated herein again.

It should be understood that for the plurality of maximum singular values, left singular vectors, and right singular vectors of the determined initial structure matrix, the maximum singular value matrix may be constructed based on the plurality of maximum singular values; the left singular matrix may be constructed based on the maximum singular value matrix and the plurality of left singular vectors; the right singular matrix may be constructed based on the maximum singular value matrix and the plurality of right singular vectors; and the reconstruction matrix may be determined based on the maximum singular value matrix, the left singular matrix, and the right singular matrix.

In some embodiments, constructing the maximum singular value matrix based on the plurality of maximum singular values may include determining one or more maximum singular values in the plurality of singular values based on a hard threshold function, and constructing the maximum singular value matrix corresponding to the one or more maximum singular values.

In some embodiments, the hard threshold function may be as shown in Formula (4). More specifically, the hard threshold $\tau$ in the hard threshold function may be determined, and the values of the plurality of maximum singular values that are less than or equal to the hard threshold $\tau$ may be deleted to obtain the remaining maximum singular values to construct the maximum singular value matrix.

In some embodiments, take the estimation of the hard threshold in the NLSF as an example, the calculation of the hard threshold τ may be expressed by the following formula.

$$\tau = \left(0.13 * 2^{\frac{(QP-4)}{6}}\right) * \left(B_s + \sqrt{c}\right) \quad \text{Formula (8)}$$

where $B_s$ denotes the number of pixels in the current image block to be process, c denotes the number of image blocks in the image block set, and QP denotes the quantization parameter. "0.31" and "0.71" in the formula may be the threshold parameters rather than fixed values. The "0.31" and "0.71" in the present embodiment may be possible values obtained through offline training. These two values may be related to a plurality of factors, such as frame type, sequence bit depth (8-bit or 10-bit), etc. In addition, the threshold parameters of the chroma and luma components may also be different.

In some embodiments, QP may be an integer between 1 and 51, and a look-up table and an array with a length of 52 may be used to express $$2^{\frac{(QP-4)}{6}}.$$

In order to convert a floating-point to a fixed-point, the calculated result may be shifted to the left and enlarged by 12 digits, and the integer part may be taken as the element in the array. The specific element values are shown in FIG. 6.

The number of "0.31" position is denoted by k, and the number of '0.71" position is denoted by b. k may be left shifted and enlarged by 12 digits, b may be left shifted and enlarged by 24 digits, such that k*QStep+b may be left shifted and enlarged by 24 digits as a whole.

For the calculation of √c in the formula, c may be left shifted and enlarged by 1 digit first before taking the square root. Correspondingly, $B_s$ may be left shifted and enlarged by 1 digit. Since $B_s$ is an integer itself, there is no loss of precision.

In order to prevent the situation of numerical overflow, before the multiplication of k*QStep+b and √c, k*QStep+b may be reduced and right shifted by 5 digits first. As such, the hard threshold τ may be left shifted and enlarged by 20 digits to achieve fixed-point.

It should be understood that when the enlargement of the singular value S and the enlargement of the hard threshold τ are different, the enlargement of the two may need to be unified before comparison. Since the initial structure matrix $x_{Gk}$ may be enlarged in the calculation of obtaining the maximum singular value, such as shifting 4 digits to the left; and the first normalization factor and the second normalization factor may be reduced, such as shifting 13 digits to the right, the obtained maximum singular value may be correspondingly enlarged by 4+13=17 digits. Therefore, when comparing the maximum singular value with the hard threshold τ, the enlargement of the maximum singular value and the hard threshold τ may be adjusted first, such that the maximum singular value with the hard threshold τ may be both enlarged by the same factor.

It should be understood that the hard threshold here may also be the hard threshold in the first predetermined condition, which will not be repeated here.

It should be understood that the fixed-point conversion in the embodiments of the present disclosure, such as the fixed-point conversion of a matrix or a vector such that the elements therein may be converted into fixed-point numbers, or the singular values may be converted into fixed-point numbers, may be an integer or a fixed-digit decimal, and the embodiments of the present disclosure are not limited thereto.

In S440, each image block may be reconstructed based on the reconstructed pixel value of each image block. It should be understood that since there may be an image block that has been filtered a plurality of times, that is, there may be a plurality of filtering results, the final results of the image block may be determined based on the weights of the obtained plurality of filtering results. For example, a tie value of the plurality of filtering results may be determined as the reconstructed pixel value of the image block.

It should be understood that since fixed-point has been realized in the filtering process, such as the obtained reconstruction matrix of the image block after the SVD process, the reconstruction matrix may be an enlarged matrix, for example, with respect to the initial structure matrix, the reconstruction matrix may be the result of a left-shift and enlargement of 4 digits, when determining the pixel value of the image block, it should be reduced to the reconstruction matrix of the same multiple as the initial structure matrix. As such, when determining the pixel value of the image block, it should be reduced to the reconstruction matrix of the same multiple as the initial structure matrix. Alternatively, when the image block includes a plurality of filtering results, if the reconstruction matrix of each filtering result is left-shifted relative to the initial structure matrix by a certain factor, such as the result of left-shifting by 4 digits, when taking the average value of a plurality of reconstruction matrices, the dividend may also need to be enlarged by 4 digits, such that the obtained average value may have the same enlargement multiple relative to the initial structure matrix.

Therefore, the video encoding and decoding method of the embodiments of the present disclosure can construct the initial structure matrix based on the image to be processed and its similar image blocks, and perform a filtering process on the initial structure matrix, where the filtering process may include one or more fix-point processes. The image block may be reconstructed based on the filtering result. By appropriately losing of decimal precision to enlarge the floating-point numbers to integers and using strict shift design, fixed-point NLSF may be achieved, and performance loss may be controlled within an acceptable range.

In the embodiments of the present disclosure, "B corresponds to A" means that B is associated with A, and according to A, B can be determined. But it should also be understood that, determining B according to A does not mean that B is only determined according to A. B can be determined according to A and/or other information.

The terms "and/or" used herein is merely an association describing an associated object, indicating that there may be three relationships. For example, A and/or B may indicate three cases, such as A exists alone, A and B both exist, and B exists alone. Moreover, the symbol "/" in the text generally indicates that the related objects in the context have an "or" relationship.

In various embodiments of the present disclosure, the magnitude of the sequence numbers of the above processes does not mean the order of the execution, and the execution sequence of each process should be determined by its function and internal logic, and should not be limited by the implementation process of the embodiments consistent with the present disclosure.

The video encoding and decoding method provided in the embodiments of the present disclosure is described in detail above with reference to FIGS. 1 to 6. An embodiment of the present disclosure further provides a video encoding and decoding apparatus, which will be described below with reference to FIG. 7.

FIG. 7 is a schematic block diagram of a video encoding and decoding apparatus 500 according to an embodiment of the present disclosure. As shown in FIG. 7, the apparatus 500 includes a processor 510 and a memory 520, and the memory 520 is connected to the processor 510. The processor 510 and the memory 520 can communicate with each other through an internal connection path, and transfer and/or control data signals. The memory can be configured to store instructions, and the processor 510 can be configured to execute the instructions stored in the memory 520. In some embodiments, the processor 520 may be configured to determine a set of image blocks based on one or more similar image blocks of an image block to be processed; generate an initial structure matrix of the image block set based on a pixel value of each image block in the image block set; perform a filtering process on the initial structure matrix to obtain a reconstructed structure matrix, which corresponds to the reconstructed pixel value of each image block, the filtering process including one or more point-fixing processes; and reconstruct each image block based on the reconstructed pixel value of each image block.

In some embodiments, the image block to be processed may be reconstructed based on the encoded data.

In some embodiments, the processor 510 may be configured to determine the search window of the image block to be processed; search to obtain a plurality of image blocks in the search window based on a predetermined search order; and determine one or more similar image blocks in the plurality of image blocks.

In some embodiments, the search window may be a quadrilateral, and the predetermined search order may be starting from the upper left corner of the search window, performing search pixel by pixel in the raster scan order, and ending the search at the lower right corner.

In some embodiments, the processor 510 may be configured to determine the similarity between each image block in the plurality of image blocks and the image block to be processed; and determine one or more similar image blocks similar to the image block to be processed in the plurality of image blocks based on the similarity of each image block and the image block to be processed.

In some embodiments, the similarity measurement parameter may include one or more of a hash difference, a sum of squared differences (SSD), a sum of absolute differences (SAD), a mean absolute differences (MAD), a mean square differences (MSD), or a structural similarity (SSIM).

In some embodiments, the image block set may include the image block to be processed and the one or more similar image blocks.

In some embodiments, the filtering process may include one or more of a discrete cosine transform (DCT), a Hadamard transform, Karhunen-Loeve transform (KLT), or a signal dependent transform (SDT).

In some embodiments, in the SDT process, the point-fixing process may be used when the covariance matrix derives the transformation kernel; and/or, in the KLT process, the point-fixing process may be used when obtaining the transform base.

In some embodiments, the processor 510 may be configured to perform SVD filtering on the initial structure matrix to obtain the reconstructed structure matrix.

In some embodiments, the processor 510 may be configured to perform a first SVD process a plurality of times to obtain a plurality of maximum singular values, a plurality of left singular vectors, and a plurality of right singular vectors of the initial structure matrix, where a first SVD process in the plurality of first SVD processes may be used to determine a maximum singular value of the initial structure matrix, and a left singular vector and a right singular vector corresponding to the maximum singular value; construct a maximum singular value matrix based on the plurality of maximum singular values; construct the a left singular matrix based on the maximum singular value matrix and the plurality of left singular vectors; construct the a right singular matrix based on the maximum singular value matrix and the plurality of right singular vectors; and determine a reconstructed structure matrix based on the maximum singular value matrix, the left singular matrix, and the right singular matrix.

In some embodiments, any one of the plurality of first SVD processes may further include a first point-fixing process, and the any one of the first SVD processes may be used to determine the first maximum singular value of the initial structure matrix, and the first left singular vector and the first right singular vector corresponding to the first maximum singular value, such that at least one of the following elements may be a fixed-point number: an element in the initial structure matrix, the first maximum singular value, an element in the first left singular vector, and an element in the first right singular vector.

In some embodiments, the first point-fixing process may include enlarging the initial structure matrix, the elements in the initial structure matrix after enlargement being fixed-point numbers.

In some embodiments, the first point-fixing process may further include adjusting the enlargement of the input matrix in the current first SVD process based on the decimal places of the elements in the initial structure matrix, such that the input matrix may have the same enlargement as the initial structure matrix after enlargement. In some embodiments, when the current first SVD process is the first first SVD process in the plurality of first SVD processes, the input matrix may be the initial structure matrix.

In some embodiments, the elements in the enlarged initial structure matrix may be integers.

In some embodiments, the processor 510 may be configured to perform the current first SVD process on the initial structure matrix, if the current first SVD process satisfies the first predetermined condition, the next first SVD process on the initial structure matrix may be stopped.

In some embodiments, the first predetermined condition may include the number of times of the first SVD processes being less than or equal to a first predetermined number of times.

In some embodiments, the first predetermined condition may include the difference between the two largest singular values obtained in the last two of the plurality of first SVD processes being less than a first predetermined value.

In some embodiments, the first predetermined condition may include the maximum singular value obtained by the last first SVD process being less than the hard threshold.

In some embodiments, the processor 510 may be configured to delete the maximum singular values less than or equal to the hard threshold in the plurality of maximum singular values to obtain the remaining maximum singular values; and constructing the maximum singular value matrix based on the remaining maximum singular values.

In some embodiments, the hard threshold may be the hard threshold after the enlargement process.

In some embodiments, the apparatus may include using a look-up table to obtain the enlarged hard threshold.

In some embodiments, the apparatus may further include adjusting the enlarged hard threshold and the maximum singular value matrix, the adjusted hard threshold and the adjusted maximum singular value matrix having the same enlargement.

In some embodiments, the processor 510 may be configured to perform the current first SVD process on the initial structure matrix based on the normalization algorithm to obtain the first maximum singular value, the first left singular vector, and the first right singular vector, the current first SVD process may be any one of the plurality of first SVD processes.

In some embodiments, the current first SVD process may include performing a plurality of second SVD processes on the input matrix based on a normalization algorithm to obtain a plurality of singular values, and the left and right singular vectors corresponding to each of the plurality of singular values. Each second SVD process in the plurality of second SVD processes may be used to determine a singular value of the input matrix, and the corresponding left singular vector and right singular vector. When the current first SVD process is the first first SVD process in the plurality of first SVD processes, the input matrix may be is the initial structure matrix. The outer loop part may further include outputting the maximum value in the plurality of singular values as the first maximum singular value obtained by the current first SVD process; outputting the first left singular vector and the first right singular vector corresponding to the first maximum singular value; and determining an output matrix based on the first left singular vector and the first right singular vector.

In some embodiments, the current first SVD process may further include determining the input matrix of the next first SVD process of the current first SVD process based on the difference between the output matrix and the input matrix.

In some embodiments, the processor 510 may be configured to perform the current second SVD process on the input matrix, if the current second SVD process satisfies the second predetermined condition, the next first SVD process on the input matrix may be stopped.

In some embodiments, the processor 510 may be configured to perform a plurality of second SVD processes on the input matrix and determining a plurality of second SVD processes satisfying the second predetermined condition in the plurality of second SVD processes.

In some embodiments, the second predetermined condition may include the number of times of the second SVD processes being performed is less than or equal to a second predetermined number of times.

In some embodiments, the second predetermined condition may include the difference between the two singular values obtained in the last two of the plurality of second SVD processes being less than a second predetermined value.

In some embodiments, the first predetermined condition may include the singular value obtained by the last second SVD process being less than a third predetermined value.

In some embodiments, the processor 510 may be configured to determine one or more normalization factors based on the input matrix; reduce the one or more normalization factors to obtain the reduced normalization factors; and perform the plurality of second SVD processes on the input matrix based on the reduced normalization factors.

In some embodiments, the processor 510 may be configured to sum the input matrix by row or column to obtain a one-dimensional first vector based on the normalization algorithm, the number of elements in the first vector may be equal to the number of image blocks in the image block set; determine a first normalization factor based on the first vector; determine a second vector based on the first vector and the first normalization factor; and perform the current second SVD process on the second vector to obtain a second singular value, a second left singular vector, and a second right singular vector of the input matrix, the current second SVD process may be any one of the plurality of second SVD processes.

In some embodiments, the processor 510 may be configured to determine a third vector based on an inner product of an input vector and the input matrix; determine a second normalization factor based on the third vector; determine the second left singular vector based on the third vector and the second normalization factor; determine a fourth vector based on the inner product of the second left singular vector; determine a third normalization factor based on the fourth vector; determine the second right singular vector based on the fourth vector and the third normalization factor; determine the modulus of the fourth vector as the second singular value; and determine the second right singular vector as the input vector of the next second SVD process of the current second SVD process. In some embodiments, when the current second SVD process is the first second SVD process in the plurality of second SVD processes, the input vector may be the second vector In some embodiments, the current second SVD process may also include a second point-fixing process, such that one or more of the second singular value, an element in the second left singular vector, or an element in the second right singular vector may originally be a fixed-point number.

In some embodiments, the second point-fixing process may include reducing the first normalization factor, such that the elements in the second vector determined based on the reduced first normalization factor may be fixed-point numbers; and/or, reducing the second normalization factor, such that the elements in the left singular vector determined based on the reduced second normalization factor may be fixed-point numbers; and/or; reducing the third normalization factor, such that the elements in the right singular vector determined based on the reduced third normalization factor may be fixed-point numbers.

In some embodiments, the first normalization factor may be the modulus of the first vector; and/or, the second normalization factor may be the modulus of the third vector; and/or, the third normalization factor may be the modulus of the fourth vector.

In some embodiments, the processor 510 may be configured to filter the initial structure matrix to obtain the enlarged reconstructed structure matrix based on the reduced first normalization factor, the reduced second normalization factor, and the reduced third normalization factor; and reduce the enlarged reconstructed structure matrix to obtain the reconstructed structure matrix, the reconstructed structure matrix having the same enlargement as the initial structure matrix.

In some embodiments, the fixed-point number may be an integer.

In some embodiments, the processor 510 may be configured to perform a plurality of filtering processes on the image block to be processed to obtain a plurality of reconstructed pixel values, and reconstructing the image block to be processed based on the weight of each reconstructed pixel value in the plurality of reconstructed pixel values.

In some embodiments, the processor 510 may be configured to reconstruct the image block to be processed based on the average value of the plurality of pixel values.

It should be understood that the video encoding and decoding apparatus 500 according to the embodiments of the present disclosure may correspond to a body for performing the corresponding method 400 according to the embodiments of the present disclosure, and the foregoing and other operations and/or functions of the units in the apparatus 500 are respectively used to implementing corresponding procedures of the method 400 shown in FIGS. 1 to 4. For brevity, details are not described herein again.

Therefore, the video encoding and decoding apparatus of the embodiments of the present disclosure can construct the initial structure matrix based on the image to be processed and its similar image blocks, and perform a filtering process on the initial structure matrix, where the filtering process may include one or more fix-point processes. The image block may be reconstructed based on the filtering result. By appropriately losing of decimal precision to enlarge the floating-point numbers to integers and using strict shift design, fixed-point NLSF may be achieved, and performance loss may be controlled within an acceptable range.

It should be understood that the video encoding and decoding method provided in the embodiments of the present disclosure may also be executed by a corresponding video encoding and decoding device. The device may include a software module corresponding to the method used for video encoding and decoding, which will not be repeated here.

It should be understood that the apparatus of the embodiments of the present disclosure may be implemented based on a memory and a processor. The memory may be used to store instructions for executing the method of the embodiments of the present disclosure, and the processor may be used to execute the above instructions to cause the apparatus to execute the method of the embodiments of the present disclosure.

In various embodiments of the present disclosure, the processor may be a central processing unit (CPU), a general-purpose processor, a digital signal processor (DSP), an application specific integrated circuit (ASIC), a field programmable gate array (FPGA) or another programmable logic device, a discrete gate/transistor logic device, or a discrete hardware component. A general-purpose processor may be a microprocessor or any suitable processor.

In various embodiments of the present disclosure, the memory may be a volatile memory, a non-volatile memory, or a combination thereof. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and may be used as an external cache. The RAM may be a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), or a direct rambus random access memory (DRRAM). The above random access memories are used as examples to illustrate the present disclosure and should not limit the scopes of the present disclosure.

In one embodiment, when the processor is a general-purpose processor, a DSP, a ASIC, a FPGA or another programmable logic device, a discrete gate/transistor logic device, or a discrete hardware component, the memory (or the memory module) may be integrated in the processor.

The present disclosure also provides a computer-readable storage medium. The storage medium may be configured to store instructions. When the instructions are executed by the computer, the computer may perform above motion estimation methods provided by various embodiments of the present disclosure.

The present disclosure also provides a computing device including a computer-readable storage medium described above.

The present disclosure may be applied to aerial vehicle field, especially unmanned aerial vehicle field.

It should be understood that the division of the circuits, sub-circuits, and sub-units in the embodiments of the present disclosure is only exemplary. Those of ordinary skill in the art will appreciate that the exemplary circuits, sub-circuits, and sub-units described in the embodiments of the present disclosure can be split or combined again.

All or some embodiments of the present disclosure may be implemented in software, hardware, firmware, or combinations thereof. When being implemented in software, all or some embodiments of the present disclosure may be implemented in form of a computer program product. The computer program product includes one or more computer instructions. When being loaded and executed by a computer, the computer program instructions perform all or some steps or functions according to the flowcharts in the embodiments of the present disclosure. The computer may be a general-purpose computer, a special-purpose computer, a computer network, or other programmable devices. The computer program instructions may be stored in a computer readable storage medium or transferred from one computer readable storage medium to anther computer readable storage medium. For example, the computer program instructions may be transferred from one website, one computer, one server, or one data center to another web site, another computer, another server, or another data center through wired (e.g., coaxial cable, optical fiber, digital subscriber line) or wireless (e.g., infrared, wireless, microwave, etc.) communication. The computer readable storage medium may be any suitable medium accessible by a computer or a data storage device including one or more suitable media, such as a server or a data center. The suitable medium may be a magnetic medium (e.g., a floppy disk, a hard disk, a magnetic tape), an optical medium (e.g., a DVD disk), or a semiconductor medium (e.g., an SSD drive).

It should be understood that that the embodiments of the present disclosure are described by taking the total bit width of 16 bits as an example, and the embodiments of the present disclosure may be applied to other bit widths.

Reference throughout this specification to "one embodiment" or "an embodiment" means that a particular feature, structure, or characteristic associated with the embodiment is included in at least one embodiment of the present disclosure. Hence, the appearance of "In some embodiments" or "in an embodiment" in various places throughout the specification is not necessarily referring to the same embodiment. Moreover, these specific features, structures, or characteristics can be combined in one or more embodiments in any suitable manner.

In various embodiments of the present disclosure, the magnitude of the sequence numbers of the above processes does not mean the order of the execution, and the execution sequence of each process should be determined by its function and internal logic, and should not be limited by the implementation process of the embodiments consistent with the present disclosure.

In the embodiments of the present disclosure, "B corresponds to A" means that B is associated with A, and according to A, B can be determined. However, it should also be understood that, determining B according to A does not mean that B is only determined according to A. B can be determined according to A and/or other information.

The terms "and/or" used herein is merely an association describing an associated object, indicating that there may be three relationships. For example, A and/or B may indicate three cases, such as A exists alone, A and B both exist, and B exists alone. Moreover, the symbol "/" in the text generally indicates that the related objects in the context have an "or" relationship.

Those of ordinary skill in the art will appreciate that the example elements and algorithm steps described above can be implemented in electronic hardware, or in a combination of computer software and electronic hardware. Whether these functions are implemented in hardware or software depends on the specific application and design constraints of the technical solution. One of ordinary skill in the art can use different methods to implement the described functions for different application scenarios, but such implementations should not be considered as beyond the scope of the present disclosure.

For simplification purposes, detailed descriptions of the operations of example systems, devices, and units may be omitted and references can be made to the descriptions of the example methods.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit.

The foregoing descriptions are merely some implementation manners of the present disclosure, but the scope of the present disclosure is not limited thereto. Without departing from the spirit and principles of the present disclosure, any modifications, equivalent substitutions, and improvements, etc. shall fall within the scope of the present disclosure. Thus, the scope of invention should be determined by the appended claims.

What is claimed is:

1. A video encoding and decoding method comprising:
determining an image block set based on one or more similar image blocks of an image block to be processed;
generating an initial structure matrix of the image block set based on a pixel value of each image block in the image block set;
performing a filtering process on the initial structure matrix to obtain a reconstructed structure matrix, the reconstructed structure matrix corresponding to a reconstructed pixel value of the each image block, and the filtering process including one or more point-fixing processes, performing the filtering process on the initial structure matrix to obtain the reconstructed structure matrix including:
  performing a plurality of singular value decomposition (SVD) processes on the initial structure matrix to obtain a plurality of maximum singular values, a plurality of left singular vectors, and a plurality of right singular vectors of the initial structure matrix;
  constructing a maximum singular value matrix based on the plurality of maximum singular values;
  constructing a left singular matrix based on the maximum singular value matrix and the plurality of left singular vectors;
  constructing a right singular matrix based on the maximum singular value matrix and the plurality of right singular vectors; and
  determining the reconstructed structure matrix based on the maximum singular value matrix, the left singular matrix, and the right singular matrix; and
reconstructing the each image block based on the reconstructed pixel value of the each image block.

2. A video encoding and decoding apparatus comprising:
a memory storing instructions; and
a processor configured to execute the instructions to:
  determine an image block set based on one or more similar image blocks of an image block to be processed;
  generate an initial structure matrix of the image block set based on a pixel value of each image block in the image block set;
  perform a filtering process on the initial structure matrix to obtain a reconstructed structure matrix, the reconstructed structure matrix corresponding to a reconstructed pixel value of the each image block, and the filtering process including one or more point-fixing processes, performing the filtering process on the initial structure matrix to obtain the reconstructed structure matrix including:
    performing a plurality of singular value decomposition (SVD) processes on the initial structure matrix to obtain a plurality of maximum singular values, a plurality of left singular vectors, and a plurality of right singular vectors of the initial structure matrix;
    constructing a maximum singular value matrix based on the plurality of maximum singular values;
    constructing a left singular matrix based on the maximum singular value matrix and the plurality of left singular vectors;
    constructing a right singular matrix based on the maximum singular value matrix and the plurality of right singular vectors; and determining the reconstructed structure matrix based on the maximum singular value matrix, the left singular matrix, and the right singular matrix; and reconstruct the each image block based on the reconstructed pixel value of the each image block.

3. The method of claim 1, wherein the filtering process includes at least one of a Karhunen-Loeve transform (KLT) process or a signal dependent transform (SDT) process.

4. The method of claim 3, wherein the filtering process includes the SDT process, and the one or more point-fixing processes are implemented during a covariance matrix deriving a transformation kernel in the SDT process.

5. The method of claim 3, wherein the filtering process includes the KLT process, and the one or more point-fixing processes are implemented during obtaining a transform base in the KLT process.

6. The method of claim 1, wherein one point-fixing process of the one or more point-fixing processes is implemented during one SVD process of the plurality of SVD processes to cause at least one of the following to be a fixed-point number: an element in the initial structure matrix, the maximum singular value corresponding to the one SVD process, an element in the left singular vector corresponding to the one SVD process, and an element in the right singular vector corresponding to the one SVD process.

7. The method of claim 6, wherein the one point-fixing process includes enlarging the initial structure matrix to obtain an enlarged initial structure matrix with an element being a fixed-point number.

8. The method of claim 7, wherein the one point-fixing process further includes adjusting an enlargement ratio of an input matrix of the one SVD process according to decimal places of elements in the initial structure matrix such that the enlargement ratio of the input matrix is same as an enlargement ratio of the enlarged initial structure matrix.

9. The method of claim 1, wherein performing the plurality of SVD processes on the initial structure matrix includes, in response to a current SVD process satisfying a preset condition, stopping to perform a next SVD process on the initial structure matrix.

10. The apparatus of claim 2, wherein the filtering process includes at least one of a Karhunen-Loeve transform (KLT) process, or a signal dependent transform (SDT) process.

11. The apparatus of claim 10, wherein the filtering process includes the SDT process, and the one or more point-fixing processes are implemented during a covariance matrix deriving a transformation kernel in the SDT process.

12. The apparatus of claim 10, wherein the filtering process includes the KLT process, and the one or more point-fixing processes are implemented during obtaining a transform base in the KLT process.

13. The apparatus of claim 2, wherein one point-fixing process of the one or more point-fixing processes is implemented during one SVD process of the plurality of SVD processes to cause at least one of the following to be a fixed-point number: an element in the initial structure matrix, the maximum singular value corresponding to the one SVD process, an element in the left singular vector corresponding to the one SVD process, and an element in the right singular vector corresponding to the one SVD process.

14. The apparatus of claim 13, wherein the one point-fixing process includes enlarging the initial structure matrix to obtain an enlarged initial structure matrix with an element being a fixed-point number.

15. The apparatus of claim 14, wherein the one point-fixing process further includes adjusting an enlargement ratio of an input matrix of the one SVD process according to decimal places of elements in the initial structure matrix such that the enlargement ratio of the input matrix is same as an enlargement ratio of the enlarged initial structure matrix.

16. The apparatus of claim 2, wherein the processor is further configured to execute the instructions to, in response to a current SVD process satisfying a preset condition, stopping to perform a next SVD process on the initial structure matrix.

* * * * *